US012778281B2

(12) United States Patent
Mair et al.

(10) Patent No.: US 12,778,281 B2
(45) Date of Patent: Nov. 3, 2026

(54) FILLER ELEMENT, TELESCOPIC COLUMN, AND METHOD OF MAKING A TELESCOPIC COLUMN

(71) Applicant: LOGICDATA Electronic & Software Entwicklungs GmbH, Deutschlandsberg (AT)

(72) Inventors: Mathias Mair, Bad Schwanberg (AT); Michael Hartner-Stranimaier, Bad Schwanberg (AT)

(73) Assignee: LOGICDATA Electronic & Software Entwicklungs GmbH, Deutschlandsberg (AU)

(*) Notice: Subject to any disclaimer, the term of this patent is extended or adjusted under 35 U.S.C. 154(b) by 262 days.

(21) Appl. No.: 18/562,407

(22) PCT Filed: May 20, 2022

(86) PCT No.: PCT/EP2022/063775
§ 371 (c)(1),
(2) Date: Nov. 20, 2023

(87) PCT Pub. No.: WO2022/243537
PCT Pub. Date: Nov. 24, 2022

(65) Prior Publication Data

US 2024/0237815 A1 Jul. 18, 2024

(30) Foreign Application Priority Data

May 21, 2021 (DE) ..................... 10 2021 113 290.8

(51) Int. Cl.
*A47B 9/20* (2006.01)
*F16C 3/035* (2006.01)
(Continued)

(52) U.S. Cl.
CPC ................ *A47B 9/20* (2013.01); *F16C 3/035* (2013.01); *F16C 29/02* (2013.01); *F16C 29/12* (2013.01);
(Continued)

(58) Field of Classification Search
CPC .............. A47B 9/20; A47B 2200/0051; A47B 2220/0025; B29C 65/44; F16C 3/035;
(Continued)

(56) References Cited

U.S. PATENT DOCUMENTS 3,458,618 A * 7/1969 Burns ................. B29C 66/8322 264/249
3,537,762 A * 11/1970 Lodige .................... F16C 29/12 384/42
(Continued)

FOREIGN PATENT DOCUMENTS

AT 241740 B 8/1965
DE 7408117 U 12/1974
(Continued)

OTHER PUBLICATIONS

Machine translation WO-2019038095 (Year: 2019).*
International Search Report dated Sep. 9, 2022, for International Application No. PCT/EP2022/063775.

*Primary Examiner* — Taylor Morris
(74) *Attorney, Agent, or Firm* — Eschweiler & Potashnik, LLC

(57) ABSTRACT

A filler element for compensating for a tolerance between two coaxially arranged telescopic tubes of a telescopic column of a height-adjustable piece of furniture comprises a base body having a first side surface and a second side surface facing away from the first side surface. In this regard, the first side surface comprises at least one melting body that projects from the first side surface and that is
(Continued)

Figure 1:
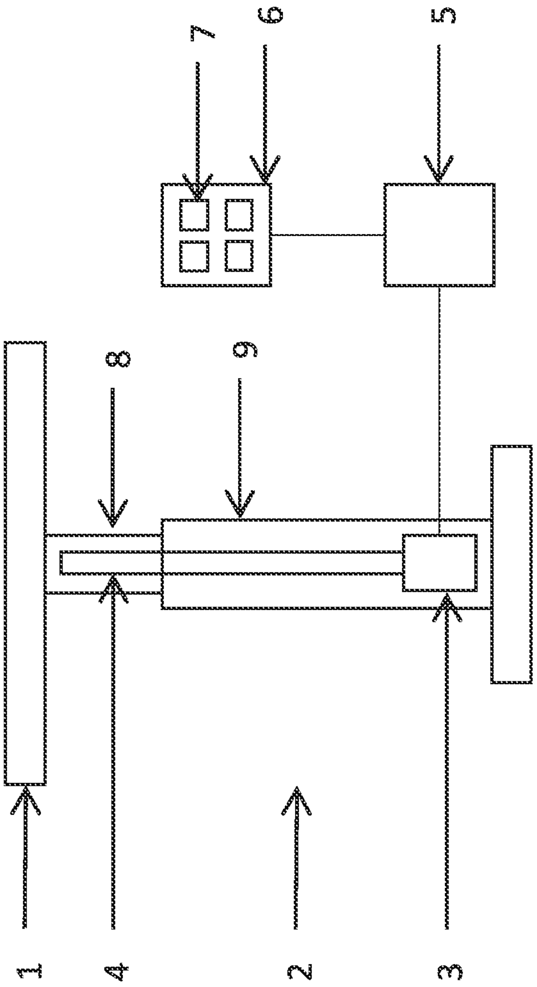

deformable upon heating. The second side surface comprises at least one sliding surface.

20 Claims, 13 Drawing Sheets

(51) Int. Cl.
*F16C 29/02* (2006.01)
*F16C 29/12* (2006.01)
*B29C 65/44* (2006.01)

(52) U.S. Cl.
CPC ....... *A47B 2200/0051* (2013.01); *B29C 65/44* (2013.01)

(58) Field of Classification Search
CPC ...... F16C 29/02; F16C 29/12; F16C 2314/70; F16C 33/20
See application file for complete search history.

(56) References Cited

U.S. PATENT DOCUMENTS

| | | | | |
|---|---|---|---|---|
| 3,873,830 | A * | 3/1975 | Forster | G01N 25/72 250/236 |
| 3,944,307 | A * | 3/1976 | Bingle | B29C 66/54 384/578 |
| 4,033,020 | A | 7/1977 | Hudgens | |
| 5,372,430 | A * | 12/1994 | Orndorff, Jr. | B63H 23/326 384/116 |
| 7,908,981 | B2 * | 3/2011 | Agee | A47B 9/04 248/188.4 |
| 9,186,875 | B1 * | 11/2015 | Loen | B32B 27/36 |
| 9,463,125 | B2 * | 10/2016 | Panzer | A61G 5/1059 |
| 10,041,624 | B2 | 8/2018 | Christen et al. | |
| 10,871,187 | B2 | 12/2020 | Walling et al. | |
| 2003/0026644 | A1 * | 2/2003 | Mastrofrancesco | F16C 29/02 403/109.1 |
| 2005/0002591 | A1 * | 1/2005 | Buitmann | F16M 11/28 384/35 |
| 2007/0042884 | A1 * | 2/2007 | Larive | D21F 5/024 492/46 |
| 2008/0308300 | A1 * | 12/2008 | Conti | C25D 5/34 174/250 |
| 2011/0076096 | A1 * | 3/2011 | Slayne | F16C 29/002 403/372 |
| 2011/0158566 | A1 * | 6/2011 | Timperi | H04M 1/0237 384/7 |
| 2011/0229252 | A1 * | 9/2011 | Roither | F16C 29/126 403/109.2 |
| 2013/0302545 | A1 * | 11/2013 | Schnelker | B23K 33/006 219/121.64 |
| 2015/0047779 | A1 * | 2/2015 | Mizuno | B29C 66/9121 156/273.9 |
| 2016/0176324 | A1 * | 6/2016 | Otto | F16C 33/26 384/282 |
| 2018/0149194 | A1 * | 5/2018 | Greinwald | B60N 2/0717 |
| 2020/0003258 | A1 * | 1/2020 | Andersson | A47B 9/20 |
| 2020/0256384 | A1 * | 8/2020 | Campbell | F16C 33/043 |
| 2020/0276766 | A1 * | 9/2020 | Hirschauer | B62D 1/20 |
| 2020/0352320 | A1 | 11/2020 | Jacobs | |
| 2021/0227970 | A1 * | 7/2021 | Randløv | A47B 9/20 |
| 2022/0185360 | A1 * | 6/2022 | Molinar | B62D 1/185 |

FOREIGN PATENT DOCUMENTS

| | | | | | |
|---|---|---|---|---|---|
| DE | 2635120 | A1 | | 2/1977 | |
| DE | 102008022191 | A1 | | 11/2009 | |
| DE | 102013009193 | B3 | * | 11/2014 | A47B 9/20 |
| DE | 102015205355 | A1 | | 9/2016 | |
| DE | 102017214895 | A1 | | 2/2019 | |
| DE | 102018101160 | A1 | * | 7/2019 | F16B 7/14 |
| EP | 2735432 | A1 | * | 5/2014 | B29C 65/46 |
| EP | 3508092 | A1 | * | 7/2019 | F16C 29/002 |
| FR | 1374258 | A | * | 10/1964 | A47B 9/20 |
| IT | 201600093930 | A1 | * | 3/2018 | A47B 9/20 |
| NL | 2013760 | B1 | * | 10/2016 | A47B 9/20 |
| SE | 517396 | C2 | * | 6/2002 | A47B 9/20 |
| SE | 541928 | C2 | * | 1/2020 | F16C 29/02 |
| WO | WO-2004041027 | A1 | * | 5/2004 | A47B 9/20 |
| WO | WO-2017157511 | A1 | * | 9/2017 | H02N 2/023 |
| WO | WO-2019038095 | A1 | * | 2/2019 | F16C 3/035 |
| WO | WO-2019091504 | A1 | * | 5/2019 | A47B 21/02 |

* cited by examiner

FILLER ELEMENT, TELESCOPIC COLUMN, AND METHOD OF MAKING A TELESCOPIC COLUMN

REFERENCE TO RELATED APPLICATIONS

This Application is a National Phase entry of International Application number PCT/EP2022/063775, filed on May 20, 2022, which claims the benefit of German Application number 10 2021 113 290.8, filed on May 21, 2021. The contents of the above-referenced Patent Applications are hereby incorporated by reference in their entirety.

Please amend the paragraph located on page 2, lines 6, 9 and 10 as follows:

The present disclosure specifies an improved compensation concept that enable telescopic columns with an improved manufacturing process.

The present disclosure relates to a filler element for compensating for a tolerance between two coaxially arranged telescopic tubes of a telescopic column of a height-adjustable piece of furniture. The present disclosure further relates to a telescopic column having such a filler element, and to a method of manufacturing a telescopic column having such a filler element.

Telescopic columns generally comprise two or possibly more telescopic tubes. The telescopic tubes can be designed, for example, as extruded sections or as rolled and longitudinally welded hollow sections. Tolerance compensation elements are generally arranged between the telescopic tubes to ensure that the telescopic tubes are guided together with as little play and friction as possible. However, the telescopic tubes are subject to large manufacturing tolerances—especially in the case of inexpensively produced tubes—which must be compensated for by the tolerance compensation elements when the lifting columns are manufactured. For this reason, tolerance compensation elements with different dimensions must be kept in stock, from which the appropriate elements are selected and fastened to the respective telescopic tube. In practice, different tolerance compensation elements often have to be tried out until a suitable element is found for the telescopic tubes to be mounted. This is time-consuming, labor-intensive and costly.

In conventional approaches, for example, tolerance compensation elements made of plastic material are also initially worked larger than is required to eliminate any play, the plastic material then being made plastic and, as long as the plastic material is plastic, the two telescopic tubes being inserted into each other. The plastic material is then allowed to solidify again.

The tolerance compensation elements are always heated and deformed on the side which subsequently serves as the sliding surface between the tubes. Heating must be carried out until the sliding surface becomes plastically deformable to allow the tubes to slide into each other. On the other hand, heating must not be carried out for too long so that the sliding surface is not damaged or the tolerance compensation elements become detached from the tube or jammed when the tubes are pushed into each other. As a result, the conventional approaches are prone to errors.

An object to be achieved is to specify an improved compensation concept that enables telescopic columns with an improved manufacturing process.

This object is achieved with the object of the independent claims. Designs and further developments are described in the dependent claims.

The improved compensation concept is based on the idea that a filler element for compensating for a tolerance between two coaxially arranged telescopic tubes of a telescopic column of a height-adjustable piece of furniture is designed in such a way that, when the telescopic column is manufactured, thermal deformation of the filler element does not occur via the sliding surface used in operation in order to prevent damage to the sliding surface. Rather, the filler element is equipped with one or more melting bodies arranged on a side of the filler element facing away from the sliding surface. Tolerance compensation is achieved during manufacture by thermal deformation of these melting bodies. Each melting body is designed to project from a base surface in order to come into contact with one of the telescopic tubes concerned. Such contact then allows the melting body to be heated and thermally deformed. Heating on a large area basis can therefore be avoided. For example, heating of the melting body takes place via heating of the telescopic tube against which the at least one melting body is in contact. As a result, a more precise deformation and thus a more precise compensation for tolerances between the coaxial telescopic tubes can be achieved compared to conventional approaches. The filler element not only compensates for tolerances but also acts as a glide between the telescopic tubes due to the sliding surface.

For example, a filler element according to the improved filler concept comprises a base body having a first side surface and a second side surface facing away from the first side surface. In this case, the first side surface comprises at least one melting body that projects from the first side surface and that is deformable upon heating. The second side surface thereby comprises at least one sliding surface.

With a filler element according to the improved compensation concept and a corresponding method, which will be explained in detail below, it is thus possible to create a height-adjustable telescopic column which can be manufactured efficiently and inexpensively using telescopic tubes of generous tolerance and which reliably avoids undesirable play between an outer and an inner telescopic tube even in the case of larger deviations of the tube dimensions from a nominal value. In addition, the deformation of the filler element, especially in the specific area being deformed, can be better controlled.

In various embodiments of the filler element, the at least one melting body tapers from the first side surface towards a free end of the at least one melting body. For example, the melting body is thicker or wider at a base, which is formed on the base body or on the first side surface, than at the projecting free end. This makes it possible, for example, to achieve even better control of the deformability when heating from the free end.

In various embodiments of the filler element, a free end of the at least one melting body has a curved surface. For example, the melting body tapers to a round tip or is spherical. This enables point contact or line contact with the telescopic tube, depending on the shape of the melting body. In particular, it is achieved that the melting body does not lie flat against the tube. Thus, when in use, the surface of the tube can be pressed against the melting body at this contact with a higher surface pressure, resulting in faster heat transfer and thus faster melting of the melting body. This measure also leads to controllable, rapid deformation.

In various embodiments of the filler element, the first side surface comprises a plurality of melting bodies projecting from the side surface at spaced intervals. This allows, for example, flexible tolerance adjustment.

In various embodiments of the filler element, the at least one melting body is rib-shaped, honeycomb-shaped and/or island-shaped. In particular, if a plurality of melting bodies are present, they may be formed in different embodiments of the foregoing.

In the various embodiments, the at least one melting body has, for example, a different melting point than the base body. This means, for example, that the melting body is already deformable at a lower temperature than the base body and, for example, also than the at least one sliding surface on the second side surface.

In various embodiments of the filler element, the first side surface further comprises at least one fastening element configured to fasten the filler element to one of the two telescopic tubes. The fastening element serves, for example, to mechanically fix the filler element to the telescopic tube concerned. The fastening element is preferably not or less easily thermally deformable than the melting body.

For example, the fastening element is designed in such a way that it can be inserted into an opening in the telescopic tube and is thus secured against lateral displacement with respect to the opening in the telescopic tube. In this context, the fastening element can have a cross-section that prevents twisting in the opening of the telescopic tube. This can be achieved, for example, by an oval design or by a cross-shaped design. In the case of an oval shape or a cross shape with different leg lengths, a preferred direction for fastening the filler element to the telescopic tube is also defined.

In various embodiments of the filler element, the second side surface includes an engagement area adapted to be engaged by a robotic mechanism. For example, the engagement region is formed by a web that can be gripped by a robotic mechanism or by a surface that can be sucked by a robotic mechanism so as to hold the filler element, respectively.

In various embodiments of the filler element, the second side surface comprises at least one beveled edge, for example a tapered edge. This can make it easier to slide one telescopic tube over the other telescopic tube when assembling the two telescopic tubes. In particular, the risk of tilting is reduced.

In principle, filler elements of the type described can be attached to any surface of a telescopic tube, namely both the inside and the outside. However, it is equally possible to design the filler element so that it extends over the corner of a telescopic tube.

Accordingly, in various embodiments, a filler element is adapted to be attached to a corner of one of the telescopic tubes and to extend across the corner. In this regard, the filler element has at least one sliding surface arranged on the second side surface on each of the two sides of the corner and at least one melting body projecting from the first side surface, for example opposite the respective sliding surface. The corner of the telescopic tube does not necessarily have to run at a fixed angle, for example 90°, but can be rounded and/or beveled. A filler element running over the corner increases flexibility and the possibilities for tolerance compensation.

A telescopic column for a height-adjustable piece of furniture using the improved compensation concept comprises, for example, a first and a second telescopic tube arranged coaxially with respect to each other, and a plurality of filler elements according to one of the embodiments described above. The filler elements are thereby arranged, for example, in a first row and in a second row axially spaced from the first row between the first and second telescope tubes. In this way, a telescopic column is achieved which allows play-free displacement despite possible generous tolerances of the telescopic tubes.

For example, the plurality of filler elements is arranged between the first and second telescopic tubes such that the at least one melting body of the filler elements is in contact with one telescopic tube of the first and second telescopic tubes. This one telescopic tube may be either the inner telescopic tube or the outer telescopic tube.

For example, the at least one sliding surface of the filler elements is in contact with another telescopic tube from the first and second telescopic tubes. The filler elements thus rest with the melting bodies against one tube, while the sliding surfaces on the other side of the filler element rest against the other telescopic tube. The melting bodies have approximately line or point contact with the corresponding telescopic tube. If the filler elements have fastening elements, one of the telescopic tubes has corresponding receptacles or openings for the fastening elements, as already explained above, in order to fix the filler element.

For example, the second telescopic tube surrounds the first telescopic tube and has an internal phase at at least one axial end. This facilitates the insertion of the first telescopic tube into the second telescopic tube.

Telescopic tubes are usually manufactured with a specified tolerance. Thus, there may be pairs of telescopic tubes in which a tolerance-related maximum distance is formed between the inner telescopic tube and the outer telescopic tube. With respect to such predetermined tolerances, the melting bodies are designed, for example, to have an oversize approximately equal to the maximum tube tolerances. In such a case, thermal deformation is not necessary or only slightly necessary.

However, in order to compensate for reverse extreme tolerances, i.e. a minimum distance between the telescopic tubes, it is favorable to have sufficient volume to displace the molten melting body in the event of thermal deformation of the melting bodies. This can be achieved, for example, by sufficient spacing between the melting bodies if several melting bodies are present on one filler element.

The improved compensation concept further relates to a method of manufacturing a telescopic column for a height-adjustable piece of furniture from a first and a second telescopic tube, which can be arranged coaxially with respect to each other. Moreover, a plurality of filler elements according to one of the previously described embodiments is used. The filler elements are arranged such that the at least one melting body of the filler elements is in contact with one telescopic tube of the first and second telescopic tubes. This one telescopic tube is heated in such a way that the melting bodies in contact with the one telescopic tube are heated by the heated one telescopic tube, in particular until the melting bodies are deformable. The first and second telescopic tubes are then pushed coaxially into one another. Heat is thus transferred via the telescopic tube exclusively or primarily to the melting elements to make them deformable, while the base body and other parts of the filler elements are not heated or are heated only to such an extent that no thermal deformation occurs. At the same time, the targeted deformation of the melting bodies optimally compensates for existing tolerances between the first and second telescopic tubes.

For example, the filler elements are first attached to the first telescopic tube, which is then heated. The first telescopic tube is then inserted into the second telescopic tube. However, it is also possible that the filler elements are attached inside the second, outer tube, the second tube is heated, and then the first tube is inserted into the second tube, thus pressing the melting bodies against the heated second tube and deforming them in the process.

The one telescopic tube can be heated inductively, for example, in an area where the melting bodies are in contact with the one telescopic tube. In this way, the heat supply can be controlled in a targeted manner. The understanding reader will recognize that the telescopic tube to be heated is formed from an inductively heatable material.

In various embodiments of the process, a friction test is carried out when the telescopic tubes are pushed into one another. For example, the force required during insertion is measured, such as the joining force, in order to draw conclusions about the friction. For example, this should be below a threshold value.

In various embodiments of the process, the heating is carried out according to a temperature profile, whereby the heating is controlled without contact by means of temperature measurement, for example infrared measurement. By means of the temperature measurement, a temperature supply can be controlled in a targeted manner such that, for example, the melting point of the melting bodies is reached or exceeded by a certain amount in order to enable optimum deformation of the melting bodies.

The temperature is measured, for example, directly at the filler elements or in the vicinity of the filler elements.

In various embodiments of the process, the telescoping of the first and second telescoping tubes takes place in combination with vibrations in the axial direction of the telescoping column. This allows better control of the insertion process, for example.

In the following, the improved balancer concept is explained in detail on the basis of exemplary embodiments with reference to the drawings. Components that are functionally identical or have an identical effect may be given identical reference signs. Identical components or components having an identical function may be explained only with respect to the figure in which they first appear. The explanation is not necessarily repeated in subsequent figures.

Figure 2B:
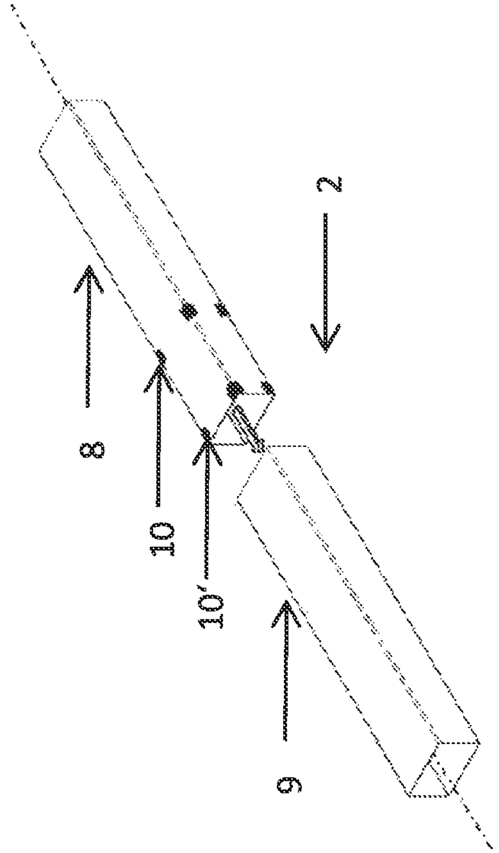
Figure 2A:
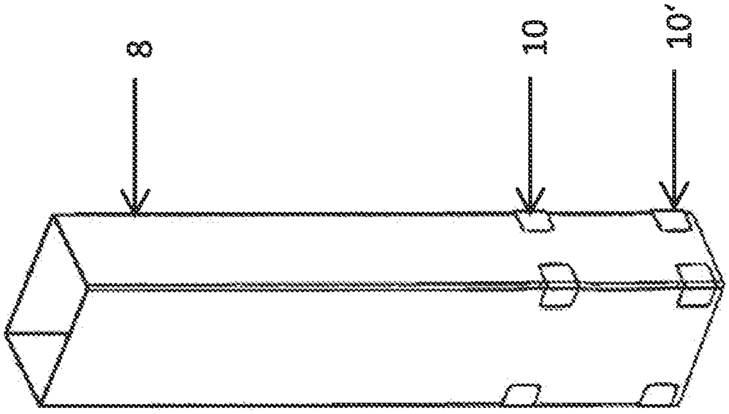
Figure 3B:
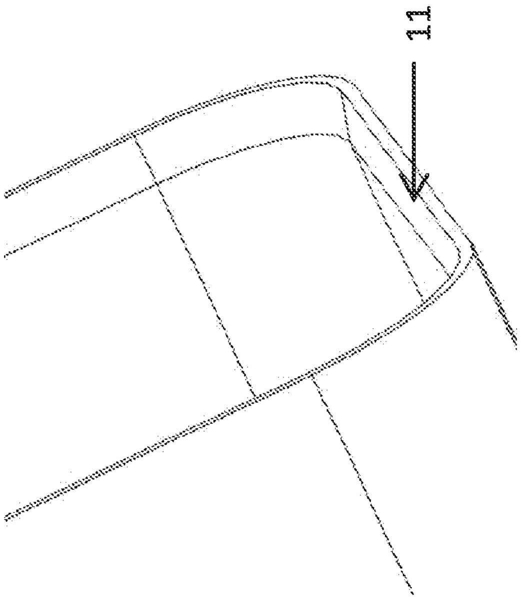
Figure 3A:
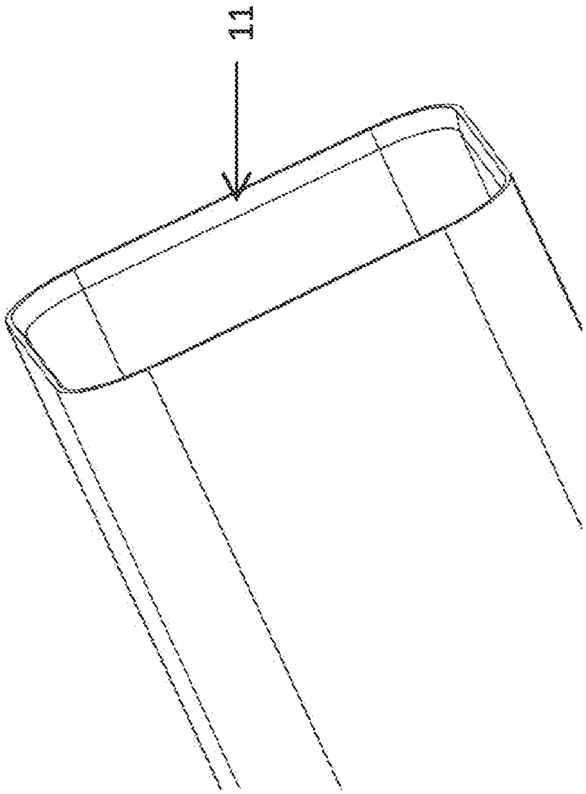
Figure 4:
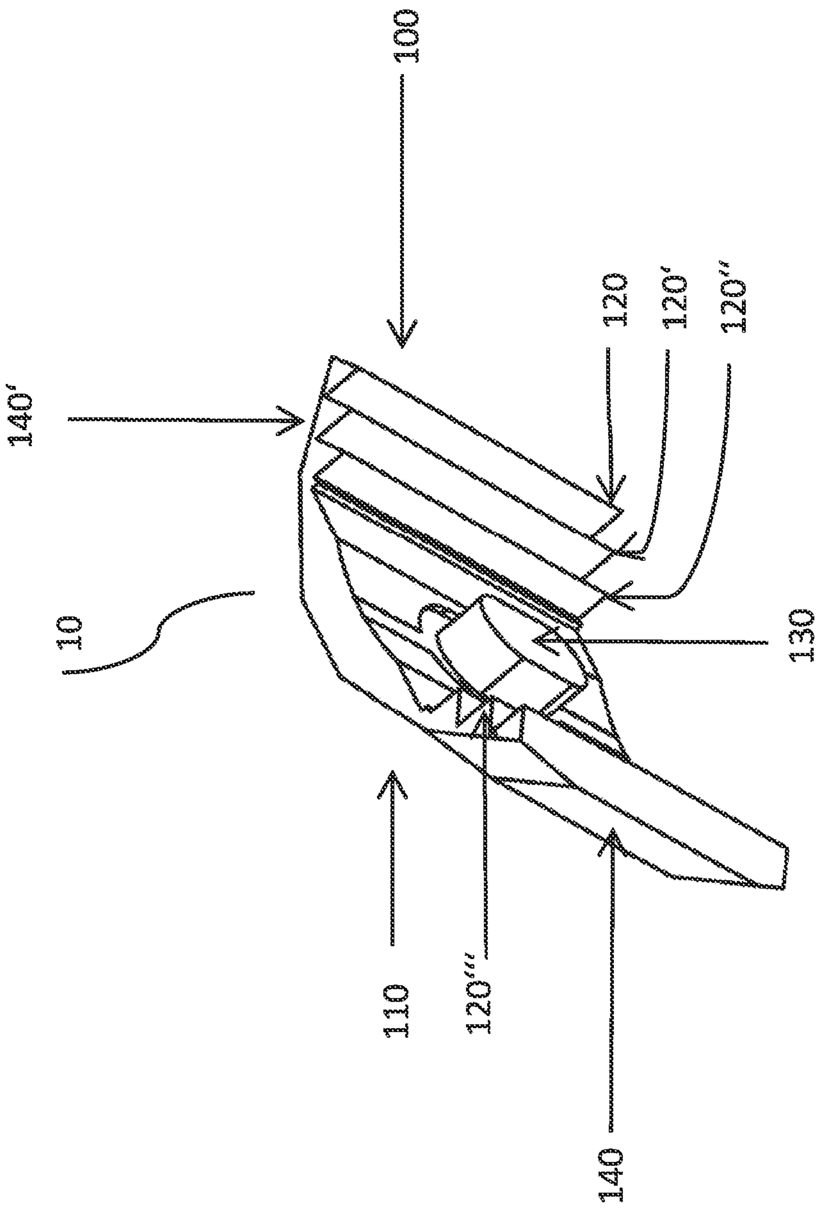
Figure 5:
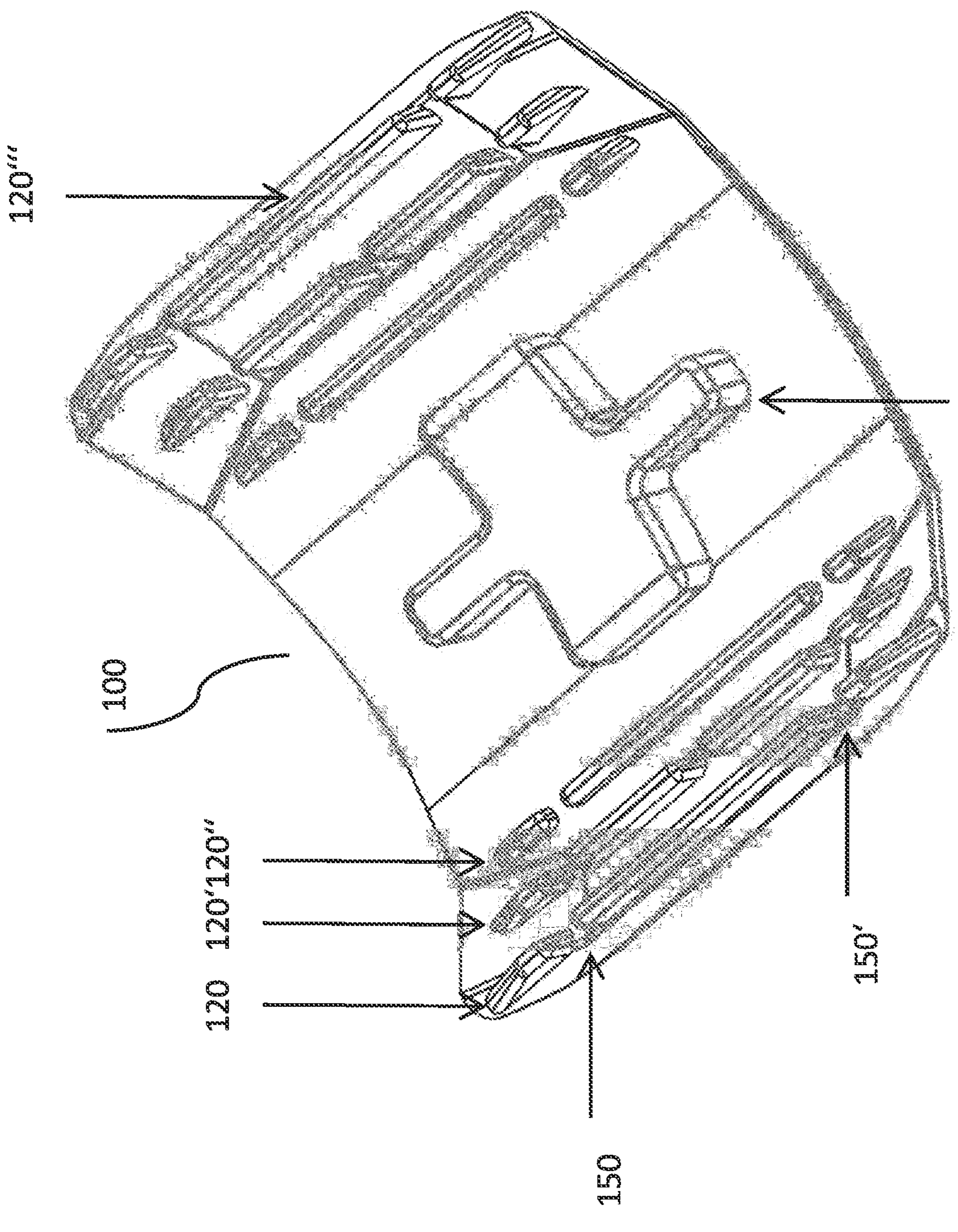
Figure 6:
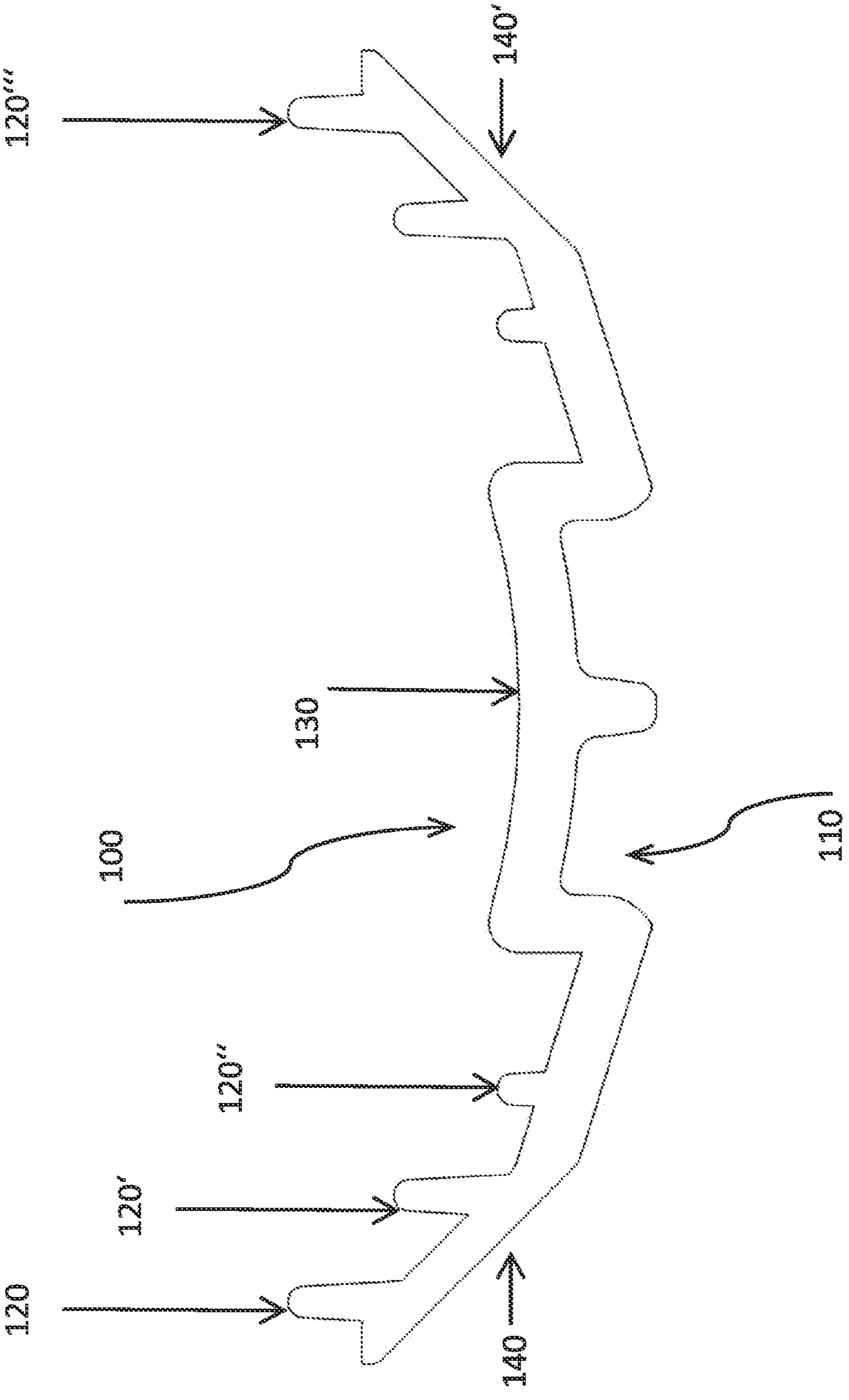
Figure 7:
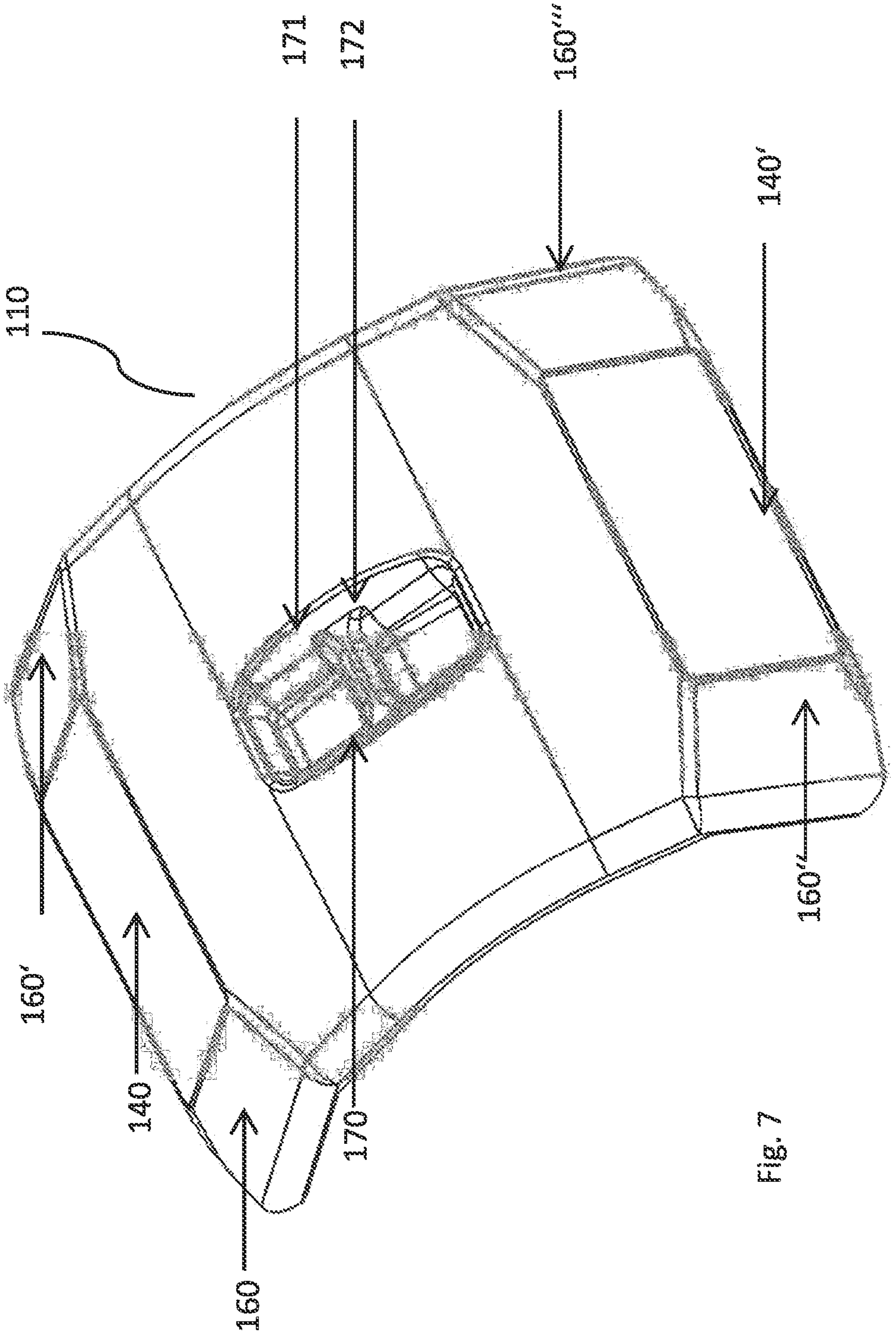
Figure 8:
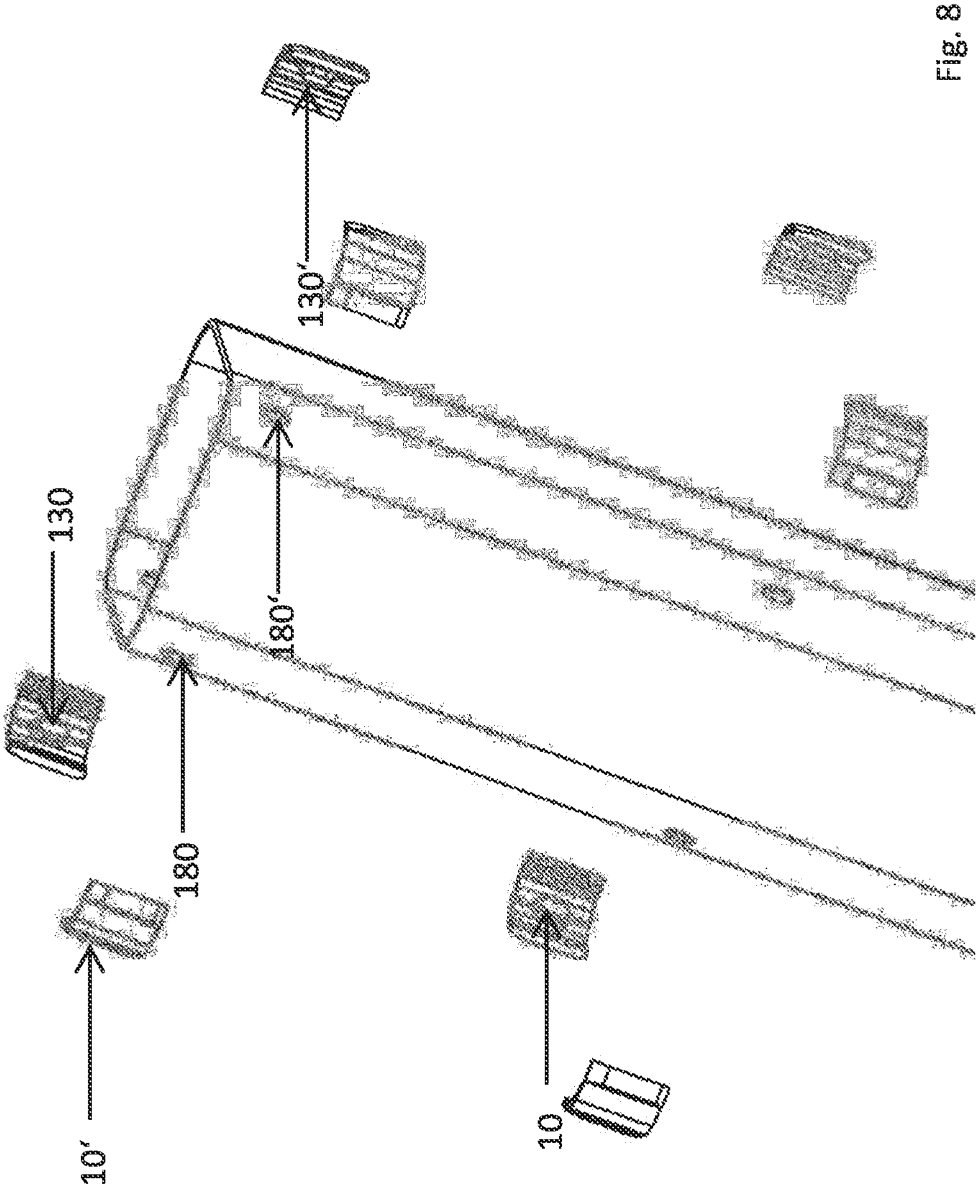
Figure 9B:
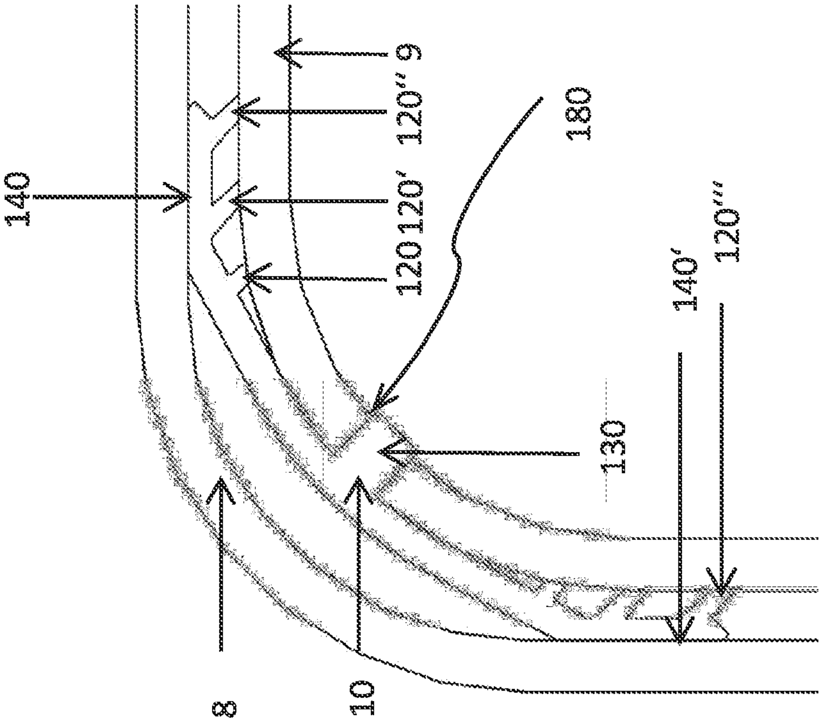
Figure 9A:
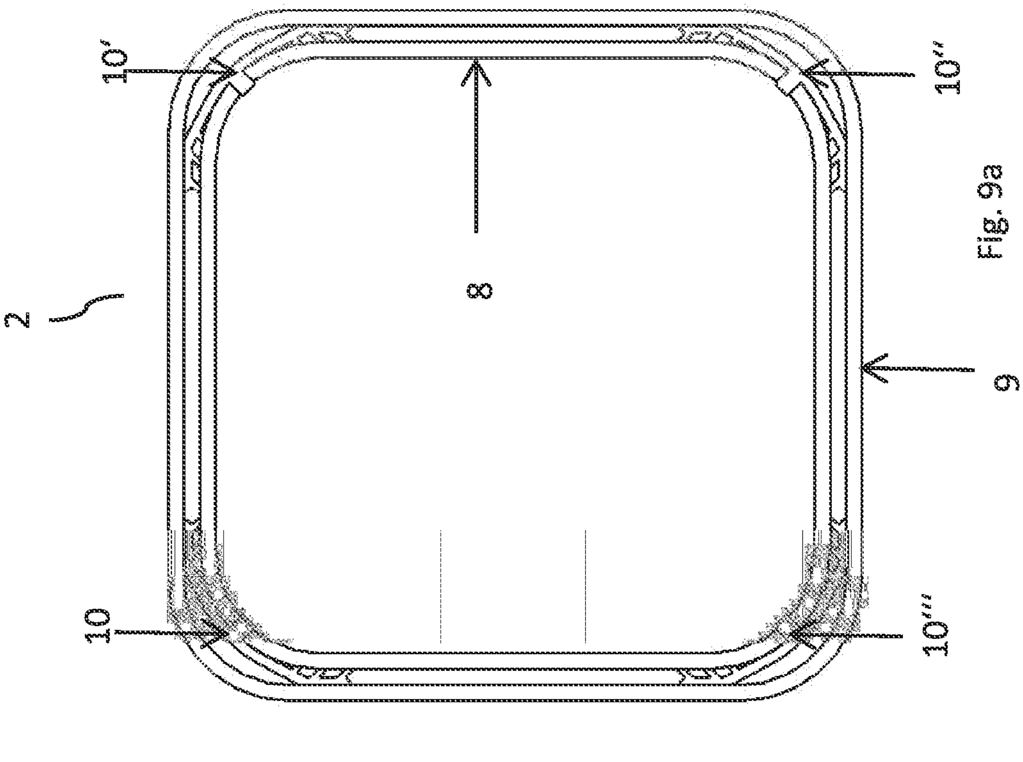
Figure 10:
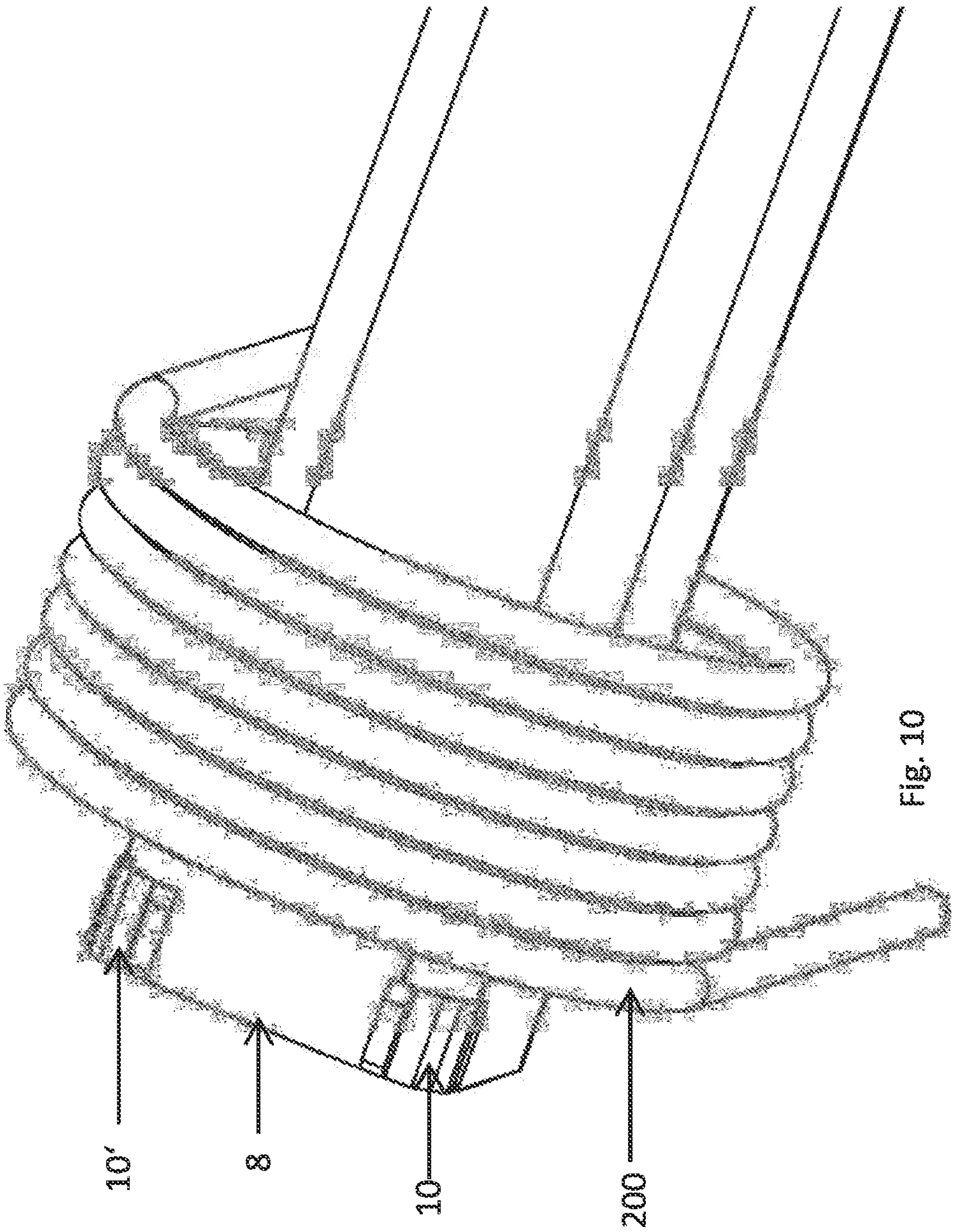

Shown are in:

FIG. 1 an embodiment of a piece of furniture with a telescopic column;

FIG. 2*a* an example of a telescopic tube with attached filler elements;

FIG. 2*b* an example of a telescopic column formed by nesting a first and a second telescopic tube;

FIGS. 3*a*, 3*b* an example of a telescopic tube with an internal circumferential chamfer;

FIG. 4 an example of a filler element;

FIG. 5 an inner side of a further embodiment of a filler element;

FIG. 6 a profile view of an embodiment of a filler element;

FIG. 7 an outer side of a further embodiment of a filler element;

FIG. 8 an exploded view of a telescopic tube;

FIG. 9*a*, 9*b* views of filler elements after mounting between telescopic tubes;

FIG. 10 a detail of a telescopic tube with an inductive coil;

FIG. 11 a clamped inner tube and outer tube assembly;

FIG. 11 an assembly of an unclamped inner tube and an outer tube; and

Figure 12:
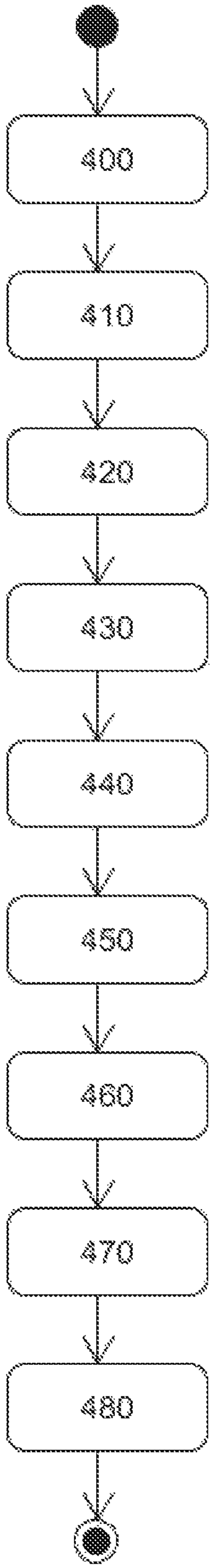

FIG. 12 an exemplary flow chart for a process for manufacturing a telescopic column.

FIG. 1 shows a telescopic column 2 for a piece of furniture, in this case, for example, a telescopic column for a worktable. The table according to FIG. 1 has a tabletop 1 which is supported by a telescopic column 2 for adjusting the height of the tabletop 1. The telescopic column 2 is adjustable in length by means of a motor 3. For this purpose, the motor 3 drives a respective adjusting drive 4, for example a spindle drive. To control the motor, a control device 5 is provided, for example, which can be controlled via an input unit 6 and forms a usual input field 7 for operating the worktable.

The telescopic column comprises at least a first telescopic tube 8 and a second telescopic tube 9, which are telescopically inserted into one another and are axially displaceable relative to one another.

Of course, it is equivalent whether the first telescopic tube can be pushed out of the top or bottom of the second telescopic tube.

FIGS. 2*a* and 2*b* show a first (in this example inner) telescopic tube 8 with filler elements 10, 10' mounted in rows for compensating for a tolerance, which may also be referred to as. FIG. 2*b* shows a telescopic column 2 formed by a first telescopic tube 8 and a second telescopic tube 9. The filler elements 10, 10' are attached to the outside of the first telescopic tube 8. The telescopic tubes 8, 9 are rectangular profiles in this example. The profile shape is selected here only as an example. Round or any angular profiles could also be used. In this case, the filler elements 10, 10' are attached to the corners of the profile. According to the improved compensation concept, the filler elements nestle against a surface of a telescopic tube, for example an outer surface of the first telescopic tube 8, to enable good thermal contact between the first telescopic tube 8 and the filler elements 10, 10'.

Filler elements 10, 10' are attached to the first tube 8 in two rows. The first row is near an end face of the first tube 8 and the second row is between the first row and at most the center of the first tube 8. To maximize a stroke length, the distance between the first and second row is e.g. smaller than a quarter of the length of the inner telescopic tube.

The clear opening cross-section of the second telescopic tube 9 is larger than the clear opening cross-section of the first telescopic tube 8. The distance between the inner surface of the second telescopic tube and the outer surface of the first telescopic tube is essentially identical over almost the entire length of the tubes; only in the area of one end face of the second telescopic tube is there an inner circumferential chamfer 11, as visible in FIGS. 3*a* and 3*b*.

FIG. 4 shows a first embodiment of a filler element 10 for mounting on a corner of the first telescopic tube 8.

The filler element 10 includes a base body having a first side surface 100 and a second side surface 110 facing away from each other, the first side surface 100 facing the first telescoping tube 8 and the second side surface 110 facing the second telescoping tube 9.

The first side surface 100 comprises at least one melting body 120 and preferably at least one fastening element 130 for fastening to the first telescopic tube 8. The second side surface 100 comprises at least one sliding surface 140, 140'.

The design of a filler element shown in FIG. 4 is symmetrical in one direction, but this is not a prerequisite for the function of the element.

In the embodiment shown, the melting bodies 120, 120', 120", 120'" are designed as ribs running longitudinally to the direction of expansion of the telescopic column 2, which are spaced apart from one another in the present case. Alternatively, honeycomb or island-shaped elements can also be formed as melting bodies. Combinations of differently shaped melting bodies are also possible.

FIG. 5 shows a further embodiment of a filler element in which the melting bodies 120 are spaced apart from one another both longitudinally and transversely to the direction of movement of the telescopic column. This spacing serves to accommodate the material deformed by heating. There should be sufficient displacement volume to accommodate the deformed volume at maximum deformation. The maximum deformation occurs when two tubes are pushed into each other with the smallest tolerance, i.e. the smallest distance from each other.

The gap can be formed, for example, as a gap 150 between the ribs. The number of gaps per rib is arbitrary.

The spacing may be implemented by having a plurality of ribs 120, 120', 120", 120'" parallel to each other and the spacing being used to accommodate deformed material.

FIG. 5 shows a combination of parallel ribs 120, 120', 120", 120'" and ribs with gaps 150, 150'.

FIG. 6 shows a section through the filler element 10 of FIG. 5. In particular, the contour/profile of the filler element can be seen. The melting bodies 120 can be seen, which in this embodiment are formed as ribs, with the free ends of the melting bodies 120 tapering relative to the base of the ribs so that less material or mass is used in the free end than in the base of a rib. The base is understood to be the portion of the melting body to which the melting body is connected at the base body. Thus, the melting body 120 heats up faster at the free end than at the base, in particular faster than the rest of the base body of the filler element.

The present disclosure differs from conventional solutions, among other things, in that filler elements are not simply heated, but it refines the principle by heating parts of a filler element, namely the melting bodies, in a targeted manner.

This targeted heating assumes that the melting bodies of the filler element become deformable faster than other parts of the filler element. It is important that the melting body is deformable earlier or faster. This is achieved by allowing the melting bodies to lie against the heat source and, for example, to have certain material and shape characteristics. In particular, the mass of the melting bodies in the area of the planned deformation is low (in particular lower than other elements adjacent to the heat source, such as the fastening body 130), which allows faster heating.

For example, the shape of the free ends of a filler element tapers from the base or from the first side surface 100.

Alternatively or additionally, the melting body can have a different melting point than the other elements of the filler element, in particular the fastening element. This can be achieved, for example, by a filler element that is constructed from two different plastics that have different melting points. This circumvents the risk of uncontrolled deformation of the fastening element. The different melting points ensure that the material at the free end can be heated and deformed more quickly without the fastener melting because it has a higher melting point.

The free ends of the melting bodies are shaped to make point or line contact with the tube. For example, the surface is curved or tapered to a round tip or spherical. Thus, the melting bodies preferably do not lie flat against the tube. The surface of the tube therefore presses against the melting body at this contact with a higher surface pressure, resulting in faster heat transfer and thus faster melting of the melting body. The high surface pressure against the surface of the tube results in controllable, rapid deformation. If the melting body were to lie flat, the deformation would take place somewhere on the surface. The melting process would then be less controllable.

In another embodiment, the melting bodies are located directly behind the sliding surface. Due to this position, the melting bodies support the filler element exactly at the sliding surface and thus exactly where little play is desired.

The height of the melting bodies or ribs, i.e. the distance between the free ends and the base, is given, for example, by the sum of the maximum tolerances of the two tubes. Thus, one filler element can be used for all possible tolerances, especially when two tubes are pushed into each other, each having the maximum worst tolerance.

The melting bodies can be of different heights to better adapt to the radius of curvature at the edges of rectangular tubes. For example, they become lower from the inside to the outside, i.e. starting from the edge. This allows the filler element to better adapt to the contour, or radius of curvature, of the pipe.

As a rule, the filler element will be made of plastic or a plastic mixture, since plastic has good sliding properties combined with good formability at low temperatures (approximately in the range of 100-150° C.) and is also inexpensive.

If the filler element is made of one material, polyoxymethylene, or POM for short, is a suitable choice. As a possible embodiment, a filler element made of two material components could be used, e.g. POM and polyamide, PA for short.

The fastening element 130 of the first side surface 100 serves, for example, to fasten the filler element 10 to the first telescopic tube. The shape of the fastening element 130 is intended to prevent the filler element 10 from being tilted, displaced or lost when the telescopic tubes 8, 9 are pushed into one another. At the same time, it should be ensured that the fastening element 130 is sufficiently insensitive to heating and does not deform, or at least does not deform to such an extent that the function of the fastening element is no longer guaranteed.

For example, the fastener 130 has a shape that is different in the X and Y directions, where X and Y substantially span the side surface 100. For example, it may be a cross, as in FIG. 5, or an oval, as in FIG. 4.

Fastening element 130 and melting body 120 lie on the same side surface 100 of the compensating element. As a result, the melting bodies are always attached at a point on the filler element that does not move relative to the first telescopic tube. Melting bodies are therefore not moved after deformation, which results in better long-term stability.

Since both the fastening element 130 and the melting bodies 120 are arranged on the same side surface and this side surface is in contact with the heat source, it is convenient to select the shape and material thickness of the fastening element in such a way that the fastening element is not deformed by the heating, or is not deformed to such an extent that its function is lost.

For example, the different masses of the fastening element (e.g.: thicker material thickness of the fastening element compared to the melting body) and the melting body (e.g. tapered shape) ensure that the temperature at which the free end of the melting body becomes deformable is not sufficient to deform the fastening element in the time during which the temperature is effective, or to influence it to such an extent that the function of the fastening element is no longer guaranteed.

The shape of a filler element, in particular the melting bodies, allows a temperature profile to be selected during production that requires minimum energy and ensures that essentially only the free ends of the melting bodies are deformed.

For example, the location of the filler element 130 is selected to be centered with respect to the side surface 100, wherein the filler element comprises the outer corners of an inner tube.

Alternatively, the fastening elements could also be arranged to the left or right of, or above or below, the melting bodies.

FIG. 7 shows an outer side of a further embodiment of a filler element. This has at least several sliding surfaces 140, 140'.

The temperature profile and/or the choice of material ensure that the sliding surfaces do not deform or deform only insignificantly. In a special embodiment, the sliding surfaces can comprise oil beads (not shown), which are realized for example by grooves in the sliding surfaces. Since the sliding surfaces are not heated or only insignificantly heated, the function of the oil beads is also ensured after the telescopic tubes have been heated and pushed into one another.

The temperature profile also ensures that surface characteristics of the pipe are not negatively affected by the heat, e.g. that discoloration of the pipe is avoided.

Alternatively or additionally, a filler element as shown in FIG. 7 may have at least one chamfered surface 160, 160', 160", 160'", which may also be referred to as a chamfer of the filler element.

This at least one inclined surface 160, 160', 160", 160'" helps to slide the second telescopic tube over the first telescopic tube. On the one hand, the surfaces form a guide for the second telescopic tube during telescoping. On the other hand, in combination with the chamfer of the second telescopic tube, they prevent tilting or loss of the filler elements during telescoping.

The inclined surfaces can also serve another purpose. For example, they serve to keep grease on the sliding surface or to guide it there.

Optionally, a filler element, as shown in FIG. 7, can also have an engagement surface 170 at which a robot or robotic mechanism can engage the filler element or also suck it in. This can further accelerate the manufacturing process, since the manual placement that is customary in the prior art is no longer required. Since the filler elements do not have to be selected to match the tolerance between the first and second telescopic tubes and the filler elements can be symmetrical in at least one direction, the use of a robot is possible with little effort.

This engagement surface can be realized, for example, in a type of grip recess 171 with a grip web 172.

Alternatively, it can be a smooth surface that has good properties for a suction pipette of a robotic arm.

Advantageously, the engagement surface 170 is located on the rear side of the fastening element 130. The pressure force of the robot arm then acts exactly at the point where the fastening element is pressed into a receptacle of a telescopic tube.

FIG. 8 shows an exploded view of the first telescopic tube 8. The filler elements 10, 10' are inserted into corresponding receptacles 180, 180', the shape of the receptacles 180, 180' corresponding to the shape of the fastening elements 130 of the filler elements 10, 10'. In this case, the shape is an oval.

In this example, the telescopic tube has rounded or chamfered corners so that the receptacles for the fastening elements are possible in the corners. In principle, however, fastening at the corner is not a prerequisite for operation, especially not for the function of the melting bodies. Thus, filler elements as shown here can be angled or otherwise flat.

FIGS. 9*a* and 9*b* show views of filler elements 10, 10', 10", 10'" after assembly between telescopic tubes 8, 9.

FIG. 9*a* shows exemplary filler elements 10, 10', 10", 10'" attached to the four corners of a telescopic column 2 between the first telescopic tube 8 and the second telescopic tube 9.

It can be seen that the fastening element 130 is fixed to the first telescopic tube 180 by a receptacle, e.g. punching, in the latter. It can be seen that the sliding surfaces 140, 140' are in contact with the inner surface of the second telescopic tube 9. The melting bodies 120, 120', 120", 120'" rest against the outside of the first telescopic tube 8. The free ends of the melting bodies are deformed.

FIG. 9*b* shows an enlarged detail of a corner.

FIG. 10 shows a first telescopic tube 8 and the inductive coil 200 for a thermal process when the telescopic tubes are brought together. The second telescopic tube 9 is not shown here so that the filler elements 10, 10' can be seen.

The proposed thermal process for manufacturing a telescopic column includes, for example:

Fitting filler elements 10, 10' to the first telescopic tube 8 in two rows in such a way that the melting bodies rest against the first telescopic tube 8.

Heating, for example inductively, of the first telescopic tube 8 in the area of the first row of filler elements.

The first and second telescopic tubes 8, 9 are pushed into each other so that the first row of filler elements is covered by the second telescopic tube 9.

Heating, for example inductively, of the first telescopic tube 8 in the area of the second row of filler elements.

Complete nesting of the first and second telescopic tubes 8, 9.

Warming up is preferably done before telescoping.

For example, FIG. 10 shows the process at the step where the coil 200 heats the second row of filler elements. The coil is already above the second row. The first row is already deformed and would be located under the second telescopic tube 9, which is not shown for overview reasons.

The process is optionally characterized by a temperature measurement of the surface temperature of the first telescopic tube in order to achieve the required accuracy of the temperature by appropriate control. The measurement takes place, for example, at the same time as the heating process.

It can be a non-contact measurement of the surface temperature, e.g. an infrared measurement of the surface temperature.

The measurement takes place, for example, in the area of the filler element attached to the first telescopic tube, i.e. directly on the filler element itself or in the close-up area around it.

In a further embodiment, heating can be stopped as soon as the temperature measuring device signals that a sufficiently high temperature has been reached and that the melting bodies are thus deformable. The measurement in the area of the filler elements ensures that only the melting bodies are deformable and that the surface properties of other areas of the filler element are not affected. This results in heating of the filler element region by region instead of the usual through-heating of the filler element.

In order to be able to implement a specific temperature profile, such as a specific temperature curve over time, the method can further comprise a time measurement.

In contrast to the prior art, only the surface of the first telescopic tube is heated, for example by an inductive process. The second telescopic tube is not heated. This process heats from the inside outwards, starting from the first telescopic tube and moving to the free ends of the melting bodies. As soon as these ends are sufficiently heated, the heating stops so that the remaining areas of the filler element are not heated or are barely heated.

The coil for inductive heating surrounds the first tube. The heating or the temperature profile starts as soon as a row of filler elements is covered by the coil.

Another manufacturing detail concerns the clamping of the first telescopic tube during production. The first telescopic tube is clamped first.

Figure 11A:
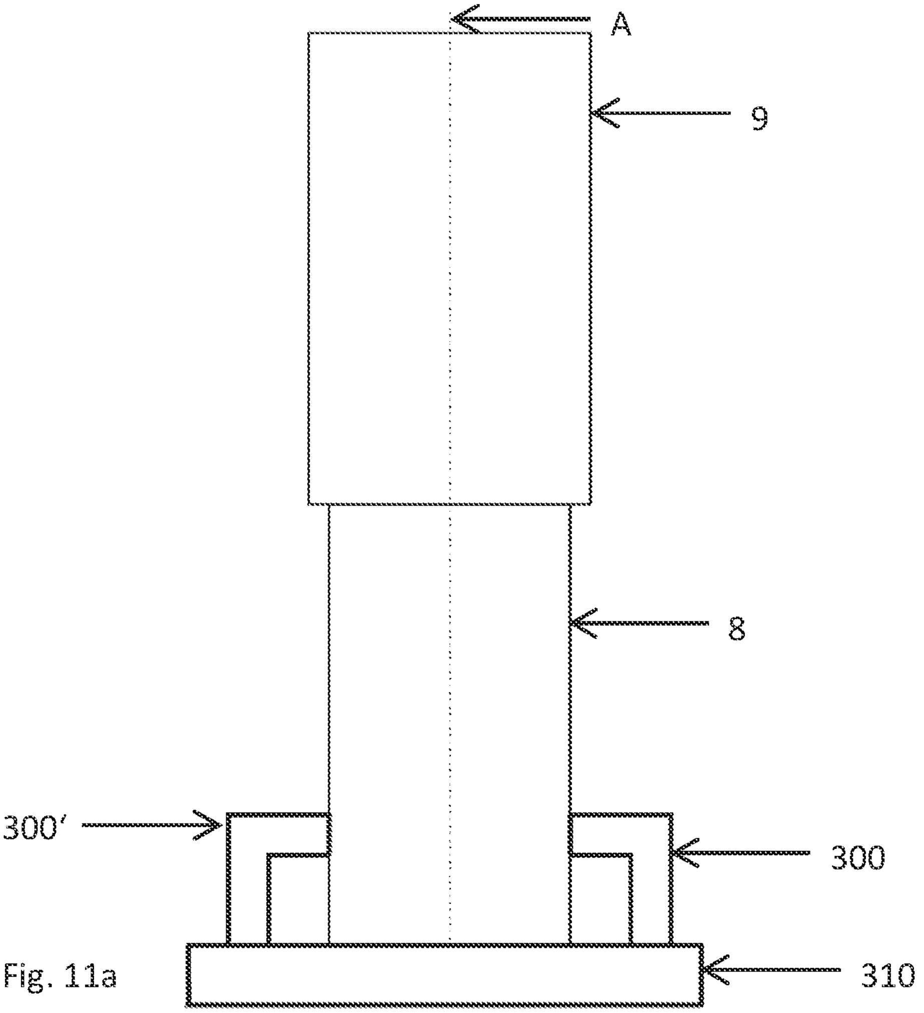

FIG. 11*a* shows an arrangement of a clamped first telescopic tube as the inner tube and a second telescopic tube as the outer tube.

Now the centers of the first and the second telescopic tube 8, 9 are aligned to a common axis A. For this purpose, the clamping device 300, 300' for the first telescopic tube, for example, is located on a surface 310 movable in x-y direction perpendicular to the axis A.

Alternatively, the tube can also be gripped from the side, with the gripper mounted on an arm or gantry that can be moved in x and y directions. The alignment is controlled, for example, by an optical measuring method.

The second telescopic tube 9 is then pushed over the first telescopic tube 8.

The special feature is that the clamping of the first telescopic tube 8 is already released as soon as the first tube 8 is stabilized by the second tube 9. This means that when two telescopic tubes are pushed into each other, one of the tubes is movable in the radial direction and clamped in the axial direction.

Figure 11B:
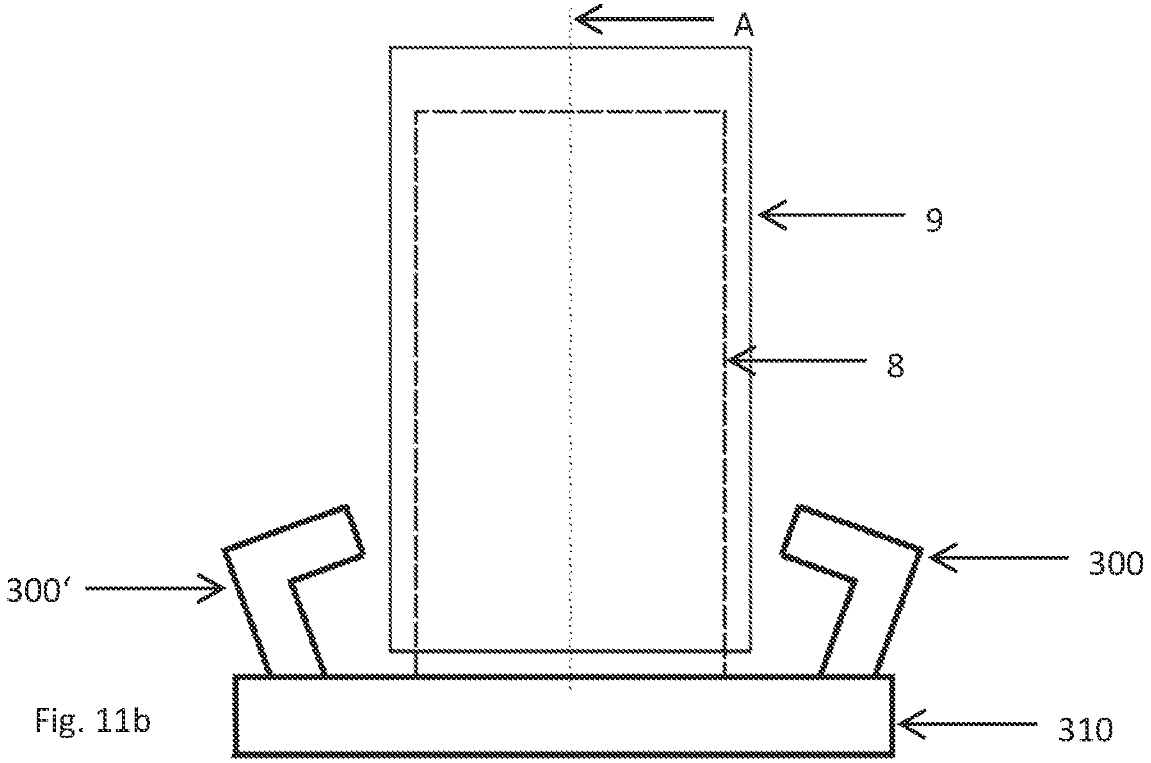

FIG. 11*b* shows the tubes 8, 9 pushed into each other and the open clamping device 300, 300'.

Stabilization of the second tube 9 by the first tube 8 is provided, for example, when the chamfer 11 of the second telescopic tube 9 has been brought into contact with the inclined surfaces of the first telescopic tube 8.

The first telescopic tube 8 is then heated and the melting bodies deform as the outer tube 9 is pushed over them, allowing the first telescopic tube 8 to move as it is no longer rigidly clamped. This allows the tube 8 to align itself ideally on its own. The deformation of the individual filler elements is thus improved.

After both rows of filler elements have been deformed, the tubes 8, 9 are pushed completely into each other. At the same time, a friction measurement can be made during this process to check the proper functioning of the filler elements.

In a special embodiment, the telescope tubes are nested in a pulsed manner. Vibrations in the axial direction of the telescope column make it easier to telescope.

In the previous description, it was assumed that the filler elements are attached to the outside of the inner telescopic tube.

In principle, these can also be attached to the inside of the outer telescopic tube. With this solution, it is more difficult to attach the filler elements inside the outer telescopic tube. In this embodiment, the melting bodies are then heated by the outer tube. In this arrangement, which is not shown in the figures, the melting bodies lie against the inside of the outer telescopic tube and the sliding surfaces face the inner telescopic tube.

FIG. 12 summarizes one embodiment of the manufacturing process comprising various steps:

In step 400, the first telescopic tube is clamped by the clamping device. In step 410, the telescopic tubes are aligned with each other so that their respective centers lie on a common axis A. In step 420, the telescopic tubes are pushed into each other (fitting operation) to such an extent that the chamfer of the second telescopic tube and the inclined surfaces of the filler elements of the first row are substantially adjacent to each other and therefore the tubes are substantially held in position. In step 430, the clamping means of the first telescopic tube is opened. In step 440, the first row of filler elements is warmed up. In step 450, the telescopic tubes are pushed into each other until the first row of filler elements has been covered, or deformed, by the second tube. In step 460, the second row of filler elements is heated. In step 470, the second row of filler elements is nested in the same way as in step 450. In step 480, the telescopic tubes are finally pushed completely into one another, with a friction measurement taking place, for example.

The invention claimed is:

1. A filler element for compensating for a tolerance between two coaxially arranged telescopic tubes of a telescopic column of a height-adjustable piece of furniture, the filler element comprising:

a base body having a first side surface and a second side surface facing away from the first side surface, wherein the first side surface comprises at least one melting body which projects from the first side surface and which is deformable upon heating, wherein the second side surface comprises at least one sliding surface, wherein an entirety of the filler element is made of a plastic or a plastic mixture, and wherein a free end of the at least one melting body has a curved surface, wherein the curved surface is configured to provide a point contact or line contact with one of the telescopic tubes, such that a surface of the one of the telescopic tubes is pressed against the at least one melting body at the point contact or line contact with higher pressure than a flat surface, resulting in a faster heat transfer than a flat surface and efficient melting of the at least one melting body, thereby enabling a controllable, rapid deformation.

2. The filler element according to claim 1, wherein the at least one melting body tapers from the first side surface towards a free end of the at least one melting body.

3. The filler element according to claim 1 wherein the first side surface comprises a plurality of melting bodies projecting from the first side surface in spaced relation to each other.

4. The filler element according to claim 1 wherein the at least one melting body is shaped according to at least one of the following:

rib-shaped, honeycomb-shaped, island-shaped.

5. The filler element according to claim 1, wherein the at least one melting body has a different melting point than the base body.

6. The filler element according to claim 1 wherein the first side surface further comprises at least one fastening element adapted to fasten the filler element to one of the two telescopic tubes.

7. The filler element according to claim 1, wherein the second side surface comprises an engagement area adapted to be engaged by a robotic mechanism.

8. The filler element according to claim 1, wherein the second side surface comprises at least one beveled edge or intapering edge.

9. The filler element according to claim 1, which is adapted to be fixed to a corner of one of the telescopic tubes and to extend over the corner, the filler element comprising, on both sides of the corner, respectively at least one sliding surface arranged on the second side surface and at least one melting body projecting from the first side surface, in particular facing the respective sliding surface.

10. A telescopic column for a height-adjustable piece of furniture, the telescopic column comprising-a first and a second telescopic tube, which are arranged coaxially to each other;

a plurality of filler elements according to claim 1, which are arranged in a first row and in a second row axially spaced from the first row between the first and second telescopic tubes.

11. The telescopic column according to claim 10, wherein the plurality of filler elements are disposed between the first and the second telescopic tube such that the at least one melting body of the filler elements are in contact with one telescopic tube of the first and second telescopic tubes.

12. The telescopic column according to claim 10, wherein the at least one sliding surface of the filler elements is in contact with another telescopic tube of the first and second telescopic tubes.

13. The telescopic column according to claim 10, wherein the second telescopic tube surrounds the first telescopic tube and has an internal chamfer at at least one axial end.

14. A method of manufacturing a telescopic column for a height-adjustable piece of furniture from first and second telescopic tubes arrangeable coaxially with respect to each other and from a plurality of filler elements according to claim 1 arranged such that the at least one melting body of the filler elements is in contact with one telescopic tube of the first and second telescopic tubes, the method comprising:

heating the one telescopic tube such that the heated one telescopic tube heats the at least one melting body in contact with the one telescopic tube; and coaxial nesting of the first and second telescopic tubes.

15. The method according to claim 14, wherein the first telescopic tube is inserted into the second telescopic tube, and wherein the first telescopic tube is heated.

16. The method according to claim 14, wherein the heating of the one telescopic tube is performed inductively.

17. The method according to claim 14, wherein a friction test is performed during coaxial nesting.

18. The method according to claim 14, wherein the heating is carried out according to a temperature profile and the heating is controlled without contact by means of infrared temperature measurement.

19. The method according to claim 18, wherein the temperature measurement is carried out directly at the filler elements or in the vicinity of the filler elements.

20. The method according to claim 14, wherein the coaxial nesting of the first and second telescopic tubes is performed in combination with vibrations in an axial direction of the telescoping column.

* * * * *